(12) United States Patent
Barak et al.

(10) Patent No.: US 10,533,446 B2
(45) Date of Patent: Jan. 14, 2020

(54) ALTERNATIVE W-SEAL GROOVE ARRANGEMENT

(71) Applicant: UNITED TECHNOLOGIES CORPORATION, Farmington, CT (US)

(72) Inventors: Daniel Barak, Jupiter, FL (US); Joseph F. Englehart, Gastonia, NC (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 302 days.

(21) Appl. No.: 15/623,208

(22) Filed: Jun. 14, 2017

(65) Prior Publication Data

US 2018/0328214 A1  Nov. 15, 2018

Related U.S. Application Data

(60) Provisional application No. 62/506,157, filed on May 15, 2017.

(51) Int. Cl.
| | | |
|---|---|---|
| *F01D 11/14* | (2006.01) | |
| *F01D 11/16* | (2006.01) | |
| *F01D 11/08* | (2006.01) | |
| *F01D 11/00* | (2006.01) | |
| *F16J 15/08* | (2006.01) | |

(52) U.S. Cl.
CPC ............ *F01D 11/14* (2013.01); *F01D 11/005* (2013.01); *F01D 11/08* (2013.01); *F01D 11/16* (2013.01); *F16J 15/0887* (2013.01); *F05D 2220/32* (2013.01); *F05D 2240/11* (2013.01); *F05D 2240/55* (2013.01); *F05D 2250/185* (2013.01); *F05D 2260/38* (2013.01); *F05D 2300/175* (2013.01); *F05D 2300/177* (2013.01); *F05D 2300/501* (2013.01)

(58) Field of Classification Search
CPC .......... F01D 11/08; F01D 11/12; F01D 11/14; F01D 11/16
See application file for complete search history.

(56) References Cited

U.S. PATENT DOCUMENTS

| | | | | |
|---|---|---|---|---|
| 4,573,866 | A * | 3/1986 | Sandy, Jr. | ............... F01D 11/08 415/116 |
| 4,642,024 | A * | 2/1987 | Weidner | .................. F01D 11/08 415/116 |

(Continued)

OTHER PUBLICATIONS

European Patent Office, European Search Report dated Sep. 21, 2018 in Application No. 18170407.3-1006.

*Primary Examiner* — Kenneth J Hansen
*Assistant Examiner* — Maranatha Boardman
(74) *Attorney, Agent, or Firm* — Snell & Wilmer LLP

(57) ABSTRACT

A blade outer air seal (BOAS) assembly includes a rotor blade configured to rotate about an axis. The BOAS assembly also includes a BOAS positioned radially outward from the rotor blade and having a forward-facing BOAS face. The BOAS assembly also includes a shroud block positioned radially outward from the BOAS, having an aft-facing shroud face, and being configured to support the BOAS. The BOAS assembly also includes a first bellows seal extending from the forward-facing BOAS face to the aft-facing shroud face and configured to reduce fluid leakage radially between the BOAS and the shroud block.

15 Claims, 4 Drawing Sheets

(56) References Cited

U.S. PATENT DOCUMENTS

| | | | |
|---|---|---|---|
| 5,048,288 A | 9/1991 | Bessette et al. | |
| 5,423,659 A | 6/1995 | Thompson | |
| 5,988,975 A | 11/1999 | Pizzi | |
| 6,352,267 B1 | 3/2002 | Rode | |
| 7,207,771 B2 * | 4/2007 | Synnott | F01D 11/08 415/173.1 |
| 7,600,967 B2 * | 10/2009 | Pezzetti, Jr. | F01D 11/005 415/115 |
| 8,079,807 B2 | 12/2011 | Shapiro et al. | |
| 8,926,270 B2 * | 1/2015 | Karafillis | F01D 9/02 415/173.1 |
| 2013/0156556 A1 * | 6/2013 | Franks | F01D 25/246 415/182.1 |
| 2016/0003080 A1 | 1/2016 | McGarrah | |
| 2016/0024926 A1 | 1/2016 | Jaureguiberry et al. | |
| 2016/0319689 A1 * | 11/2016 | Vetters | F01D 11/12 |
| 2016/0376921 A1 * | 12/2016 | O'Leary | F01D 25/12 415/116 |
| 2017/0002675 A1 | 1/2017 | Lutjen et al. | |
| 2017/0030214 A1 * | 2/2017 | Strock | F01D 25/246 |
| 2017/0114670 A1 | 4/2017 | Shapiro et al. | |

\* cited by examiner

ALTERNATIVE W-SEAL GROOVE ARRANGEMENT

CROSS-REFERENCE TO RELATED APPLICATIONS

This application claims the benefit and priority of U.S. Provisional Application No. 62/506,157, entitled "ALTERNATIVE W-SEAL GROOVE ARRANGEMENT," filed on May 15, 2017, the entire contents of which are incorporated by reference herein.

FIELD

The present disclosure is directed to a seal for reducing radial air leakage between a blade outer air seal (BOAS) and a shroud block of a compressor section or a turbine section of a gas turbine engine.

BACKGROUND

Gas turbine engines, such as those that power modern commercial and military aircraft, may include a fan section to propel the aircraft, a compressor section to pressurize a supply of air from the fan section, a combustor section to burn fuel in the presence of the pressurized air, and a turbine section to extract energy from the resultant combustion gases and to generate thrust.

The compressor section and turbine section each have multiple stages of rotors that rotate about a central axis and multiple stages of stators that are stationary relative to the central axis. A blade outer air seal is positioned radially outward from the rotors and is connected to a shroud block that is located radially outward from the blade outer air seal.

SUMMARY

Disclosed herein is a blade outer air seal (BOAS) assembly. The BOAS assembly includes a rotor blade configured to rotate about an axis. The BOAS assembly also includes a BOAS positioned radially outward from the rotor blade and having a forward-facing BOAS face. The BOAS assembly also includes a shroud block positioned radially outward from the BOAS, having an aft-facing shroud face, and being configured to support the BOAS. The BOAS assembly also includes a first bellows seal extending from the forward-facing BOAS face to the aft-facing shroud face and configured to reduce fluid leakage radially between the BOAS and the shroud block.

Any of the foregoing embodiments may also include a second bellows seal, wherein the BOAS further includes an aft-facing BOAS face, the shroud block further includes a forward-facing shroud face, and the second bellows seal extends from the aft-facing BOAS face to the forward-facing shroud face and is configured to further reduce the fluid leakage radially between the BOAS and the shroud block.

In any of the foregoing embodiments the shroud block includes a shroud main body, a shroud forward radial portion extending radially inward from the shroud main body, and a shroud forward axial portion extending axially aft from the shroud forward radial portion, the BOAS includes a BOAS main body, a BOAS forward radial portion extending radially outward from the BOAS main body, and a BOAS forward axial portion extending axially forward from the BOAS forward radial portion, the forward-facing BOAS face is defined by the BOAS forward radial portion, and the aft-facing shroud face is defined by the shroud forward radial portion.

In any of the foregoing embodiments, the BOAS forward axial portion is received between the shroud main body and the shroud forward axial portion to resist separation of the BOAS from the shroud block.

In any of the foregoing embodiments, the BOAS main body includes a forward wing extending axially forward from the BOAS forward radial portion.

In any of the foregoing embodiments, the BOAS forward radial portion has a forward inner portion connected to the BOAS main body and a forward outer portion connected to the forward inner portion and extending radially outward from the forward inner portion, and the BOAS forward axial portion is positioned radially between the forward outer portion and the forward inner portion.

In any of the foregoing embodiments, an axial tolerance exists between the BOAS forward axial portion and the shroud forward radial portion to allow axial movement of the BOAS relative to the shroud block.

In any of the foregoing embodiments, an axial gap extends from the forward-facing BOAS face to the aft-facing shroud face, and the first bellows seal has an axial length in a fully extended position that is greater than the axial gap such that the first bellows seal is compressed between the forward-facing BOAS face and the aft-facing shroud face.

In any of the foregoing embodiments, the first bellows seal includes at least one of a cobalt based alloy or a nickel based alloy.

Also disclosed is a BOAS assembly. The BOAS assembly includes a rotor blade configured to rotate about an axis. The BOAS assembly also includes a blade outer air seal (BOAS) positioned radially outward from the rotor blade and having an aft-facing BOAS face. The BOAS assembly also includes a shroud block positioned radially outward from the BOAS, having a forward-facing shroud face, and being configured to support the BOAS. The BOAS assembly also includes a bellows seal extending from the aft-facing BOAS face to the forward-facing shroud face and configured to reduce fluid leakage radially between the BOAS and the shroud block.

In any of the foregoing embodiments, the shroud block includes a shroud main body, a shroud aft radial portion extending radially inward from the shroud main body, and a shroud aft axial portion extending axially forward from the shroud aft radial portion, the BOAS includes a BOAS main body, a BOAS aft radial portion extending radially outward from the BOAS main body, and a BOAS aft axial portion extending axially aft from the BOAS aft radial portion, the aft-facing BOAS face is defined by the BOAS aft radial portion, and the forward-facing shroud face is defined by the shroud aft radial portion.

In any of the foregoing embodiments, the BOAS aft axial portion is received between the shroud main body and the shroud aft axial portion to resist separation of the BOAS from the shroud block.

In any of the foregoing embodiments, the BOAS main body includes an aft wing extending axially aft from the BOAS aft radial portion.

In any of the foregoing embodiments, the BOAS aft radial portion has an aft inner portion connected to the BOAS main body and an aft outer portion connected to the aft inner portion and extending radially outward from the aft inner portion, and the BOAS aft axial portion is positioned radially between the aft outer portion and the aft inner portion.

In any of the foregoing embodiments, an axial tolerance exists between the BOAS aft axial portion and the shroud aft radial portion to allow axial movement of the BOAS relative to the shroud block.

In any of the foregoing embodiments, an axial gap exists from the aft-facing BOAS face to the forward-facing shroud face, and the bellows seal has an axial length in a fully extended position that is greater than the axial gap such that the bellows seal is compressed between the aft-facing BOAS face and the forward-facing shroud face.

In any of the foregoing embodiments, the bellows seal includes at least one of a cobalt based alloy or a nickel based alloy.

Also disclosed is a gas turbine engine having an axis. The gas turbine engine includes a compressor section configured to compress a fluid. The gas turbine engine also includes a combustor section configured to mix the fluid with fuel and combust the fluid and the fuel to generate exhaust. The gas turbine engine also includes a turbine section configured to receive the exhaust and convert the exhaust into torque. At least one of the compressor section or the turbine section includes a rotor blade configured to rotate about the axis, a blade outer air seal (BOAS) positioned radially outward from the rotor blade and having a forward-facing BOAS face, a shroud block positioned radially outward from the BOAS, having an aft-facing shroud face, and being configured to support the BOAS, and a first bellows seal extending from the forward-facing BOAS face to the aft-facing shroud face and configured to reduce fluid leakage radially between the BOAS and the shroud block.

In any of the foregoing embodiments, the BOAS further includes an aft-facing BOAS face, the shroud block further includes a forward-facing shroud face, and the at least one of the compressor section or the turbine section further includes a second bellows seal that extends from the aft-facing BOAS face to the forward-facing shroud face and is configured to further reduce the fluid leakage radially between the BOAS and the shroud block.

In any of the foregoing embodiments, the shroud block includes a shroud main body, a shroud forward radial portion extending radially inward from the shroud main body, and a shroud forward axial portion extending axially aft from the shroud forward radial portion, the BOAS includes a BOAS main body, a BOAS forward radial portion extending radially outward from the BOAS main body, and a BOAS forward axial portion extending axially forward from the BOAS forward radial portion, the forward-facing BOAS face is defined by the BOAS forward radial portion, and the aft-facing shroud face is defined by the shroud forward radial portion.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
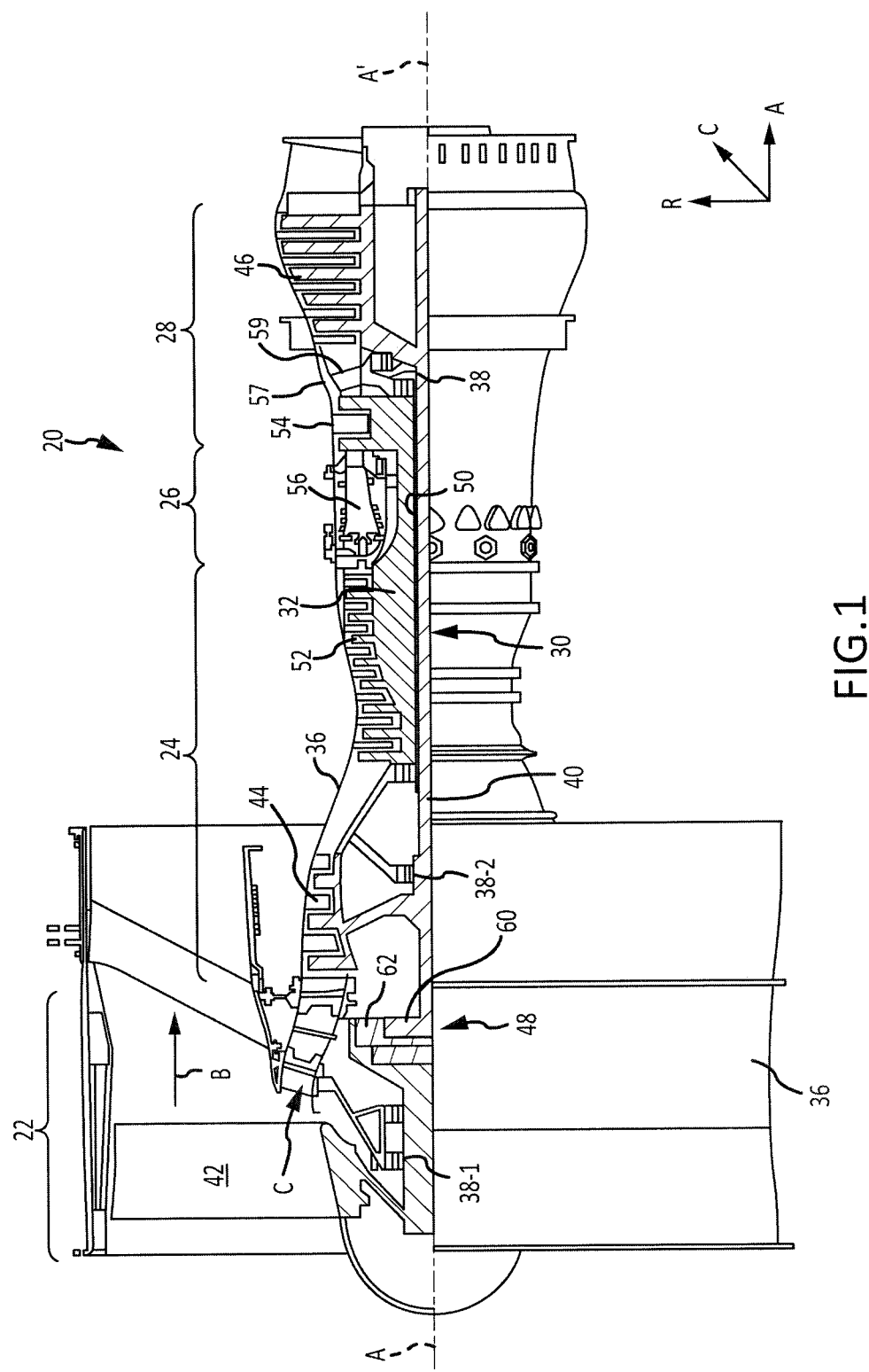
FIG. 1 is a schematic cross-section of a gas turbine engine, in accordance with various embodiments.

In various embodiments and with reference to FIG. 1, a gas turbine engine 20 is provided. An A-R-C axis is shown throughout the drawings to illustrate the axial, radial, and circumferential directions, respectively. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

The gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A combustor 26 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flow path C may be received and conditioned by a fan exit stator. After conditioning, the airflow of core flow path C may be compressed by the low pressure compressor 44 then the high pressure compressor 52, mixed and burned with fuel in the combustor 26, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Figure 2:
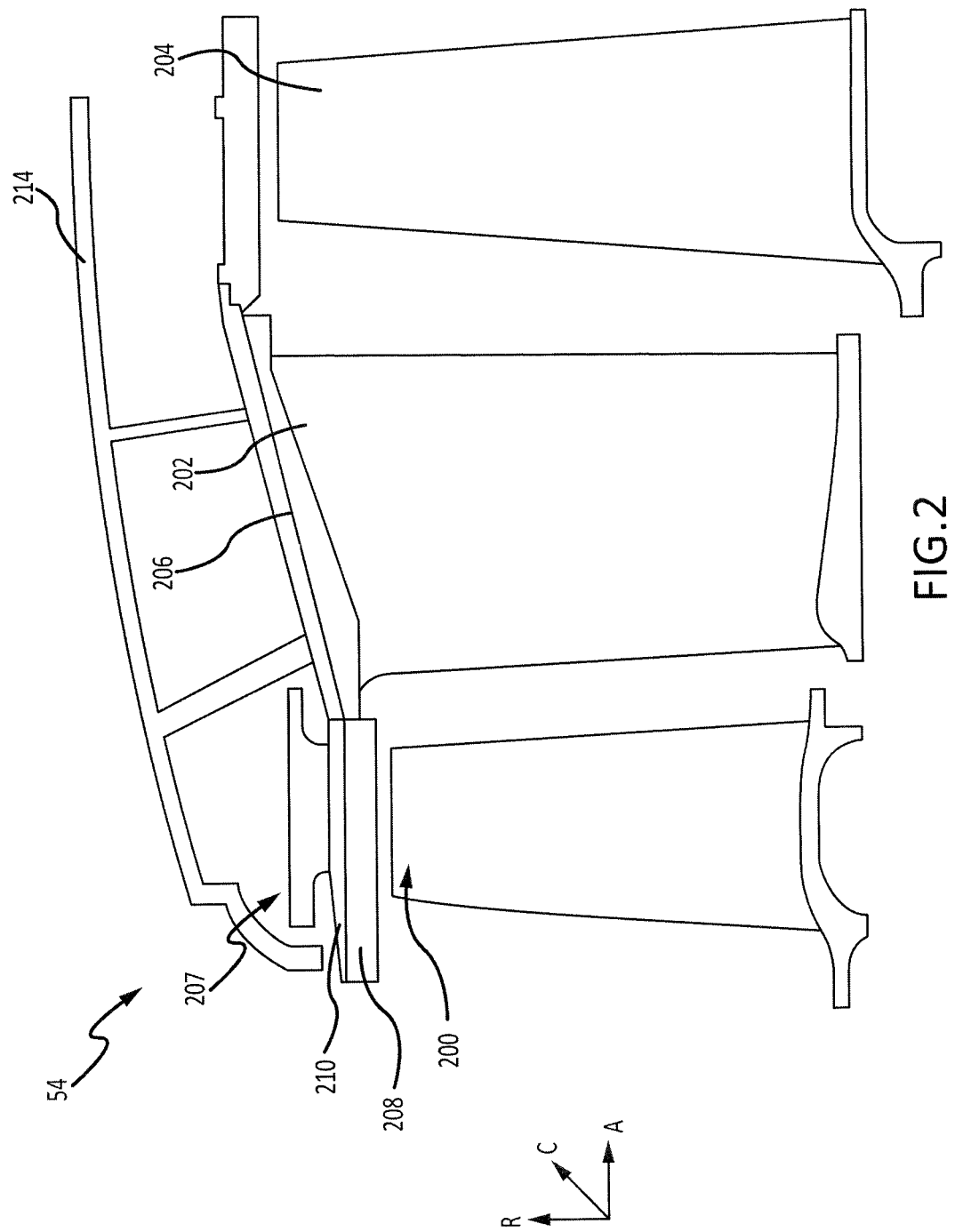
FIG. 2 is an enlarged schematic cross-section of a portion of a high pressure turbine section of the gas turbine engine of FIG. 1, in accordance with various embodiments.

With reference now to FIGS. 1 and 2, a portion of the high pressure turbine section 54 includes a first rotor blade 200, a vane 202, and a second rotor blade 204. The first rotor blade 200 and the second rotor blade 204 are each configured to rotate about the axis A-A' relative to vane 202 in response to receiving a flow of fluid from the combustor section 26. Thus, power from the flow is converted to mechanical power, or torque, by the first rotor blade 200 and the second rotor blade 204. The vane 202 is coupled to a frame 214 of the high pressure turbine 54 and conditions the flow of air between the first rotor blade 200 and the second rotor blade 204. The vane 202 thus acts as a stator and does not rotate relative to the axis A-A'.

A blade outer air seal (BOAS) 208 is located radially outward from the first rotor blade 200. The BOAS 208 is designed to function as a seal to reduce axial air leakage between the first rotor blade 200 and the frame 214. A shroud block 210 may be positioned radially outward from the BOAS 208 and may be coupled to the frame 214. The shroud block 210 may resist movement of the BOAS 208 relative to the frame 214. Stated differently, the shroud block 210 may retain the BOAS 208 in place relative to the frame 214. The BOAS 208, the shroud block 210, and the first rotor blade 200 may be referred to as a BOAS assembly 207.

It is desirable to reduce radial leakage of air between the BOAS 208 and the shroud block 210. In that regard and with reference to FIG. 3, the BOAS assembly 207 may include bellows seals, or "W seals," between the BOAS 208 and the shroud block 210 to reduce such radial air leakage. Although the disclosure is directed to providing a seal between a BOAS and a shroud block in the high pressure turbine section 54, one skilled in the art will realize that the features disclosed herein may be equally applicable to the low pressure turbine section 46, the high pressure compressor section 52, and the low pressure compressor section 44.

The shroud block 210 may include a shroud main body 300 having a forward end 302 and an aft end 304 that is located aft relative to the forward end 302. The shroud block 210 may further include a shroud forward radial portion 306 that extends radially inward from the shroud main body 300. The shroud block 210 may further include a shroud aft radial portion 308 that likewise extends radially inward from the shroud main body 300.

The shroud block 210 may further include a shroud forward axial portion 310 extending axially aft from the shroud forward radial portion 306. In various embodiments, the shroud forward axial portion 310 may be located at a radially inward end of the shroud forward radial portion 306. The shroud block 210 may further include a shroud aft axial portion 312 extending axially forward from the shroud aft radial portion 308. In various embodiments, the shroud aft axial portion 312 may be located at a radially inward end of the shroud aft radial portion 308.

The BOAS 208 may include a BOAS main body 314. The BOAS 208 may further include a BOAS forward radial portion 316 extending radially outward from the BOAS main body 314. The BOAS 208 may further include a BOAS aft radial portion 318 that likewise extends radially outward from the BOAS main body 314.

The BOAS forward radial portion 316 may include a forward inner portion 338 that is connected to the BOAS main body 314 and extends radially outward from the BOAS main body 314. The BOAS forward radial portion 316 may further include a forward outer portion 340 that is connected to the forward inner portion 338 and extends radially outward from the forward inner portion 338.

The BOAS aft radial portion 318 may include an aft inner portion 342 that is connected to the BOAS main body 314 and extends radially outward from the BOAS main body 314. The BOAS aft radial portion 318 may further include an aft outer portion 343 that is connected to the aft inner portion 342 and extends radially outward from the aft inner portion 342.

The BOAS main body 314 may include a forward wing 348 that extends axially forward from the BOAS forward radial portion 316. The BOAS main body 314 may further include an aft wing 350 that extend axially aft from the BOAS aft radial portion 318.

The BOAS 208 may further include a BOAS forward axial portion 320 that extends axially forward from the BOAS forward radial portion 316. The BOAS forward axial portion 320 may be connected to the BOAS forward radial portion 316 between the forward inner portion 338 and the forward outer portion 340. The BOAS 208 may further include a BOAS aft axial portion 322 that extends axially aft from the BOAS aft radial portion 318. The BOAS aft axial portion 322 may be connected to the BOAS aft radial portion 318 between the aft inner portion 342 and the aft outer portion 343.

In various embodiments, the shroud block main body 300 may extend at least from the BOAS forward radial portion 316 to the BOAS aft radial portion 318. Likewise, in various embodiments, the BOAS main body 314 may extend at least from the shroud forward radial portion 306 to the shroud aft radial portion 308.

One or more bellows seal may be positioned between the shroud block 210 and the BOAS main body 314. In particular, a first bellows seal 324 may be located between the shroud forward radial portion 306 and the BOAS forward radial portion 316. The shroud forward radial portion 306 may define an aft-facing shroud face 328, and the forward outer portion 340 of the BOAS forward radial portion 316 may define a forward-facing BOAS face 332. The first bellows seal 324 may extend from the aft-facing shroud face 328 to the forward-facing BOAS face 332. In that regard, the first bellows seal 324 may resist radial leakage of air between the BOAS 208 and the shroud block 210.

Likewise, a second bellows seal 326 may be located between the BOAS aft radial portion 318 and the shroud aft radial portion 308. In particular, the shroud aft radial portion 308 may define a forward-facing shroud face 330, and the aft outer portion 343 of the BOAS aft radial portion 318 may define an aft-facing BOAS face 334. The second bellows seal 326 may extend from the forward-facing shroud face 330 to the aft-facing BOAS face 334. In that regard, the second bellows seal 326 may resist radial leakage of air between the BOAS 208 and the shroud block 210.

An axial tolerance 336 may exist between the BOAS forward axial portion 320 and the shroud forward radial portion 306. The axial tolerance 336 may also or instead be located between the BOAS aft axial portion 322 and the shroud aft radial portion 308. The axial tolerance 336 may allow axial movement of the BOAS 208 relative to the shroud block 210 in the forward or aft direction. For example, the axial tolerance 336 may be between 20 thousandths of an inch (20 mils, 0.51 millimeters (mm)) and 100 mils (2.5 mm), between 40 mils (1.0 mm) and 80 mils (2.0 mm), or about 60 mils (1.5 mm). Where used in this context, about refers to the stated value plus or minus 10 percent (10%) of the stated value.

Figure 3:
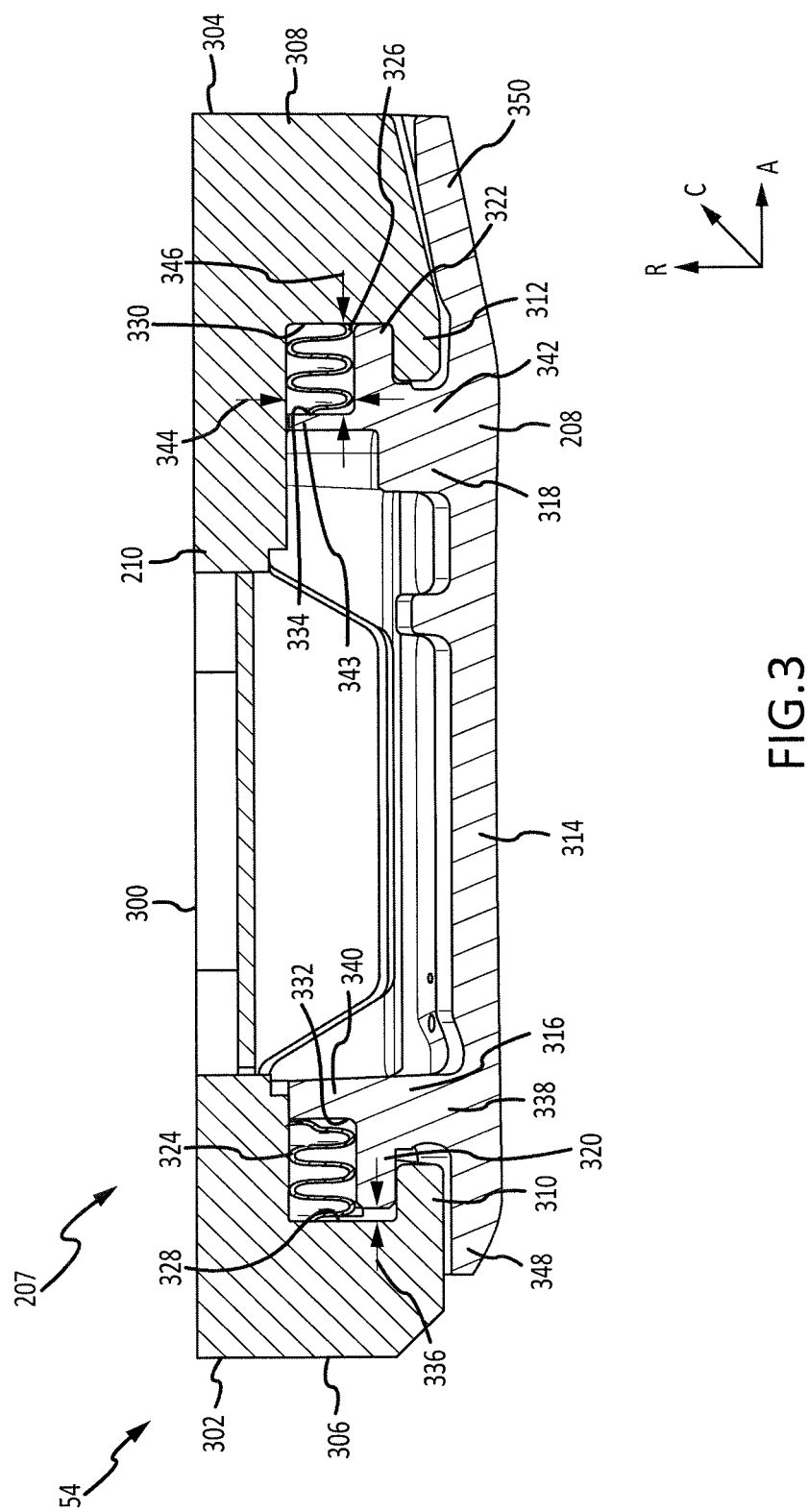
FIG. 3 is an enlarged schematic cross-section of the high pressure turbine section of FIG. 2 illustrating bellows seals between a blade outer air seal and a shroud block, in accordance with various embodiments.
Figure 4:
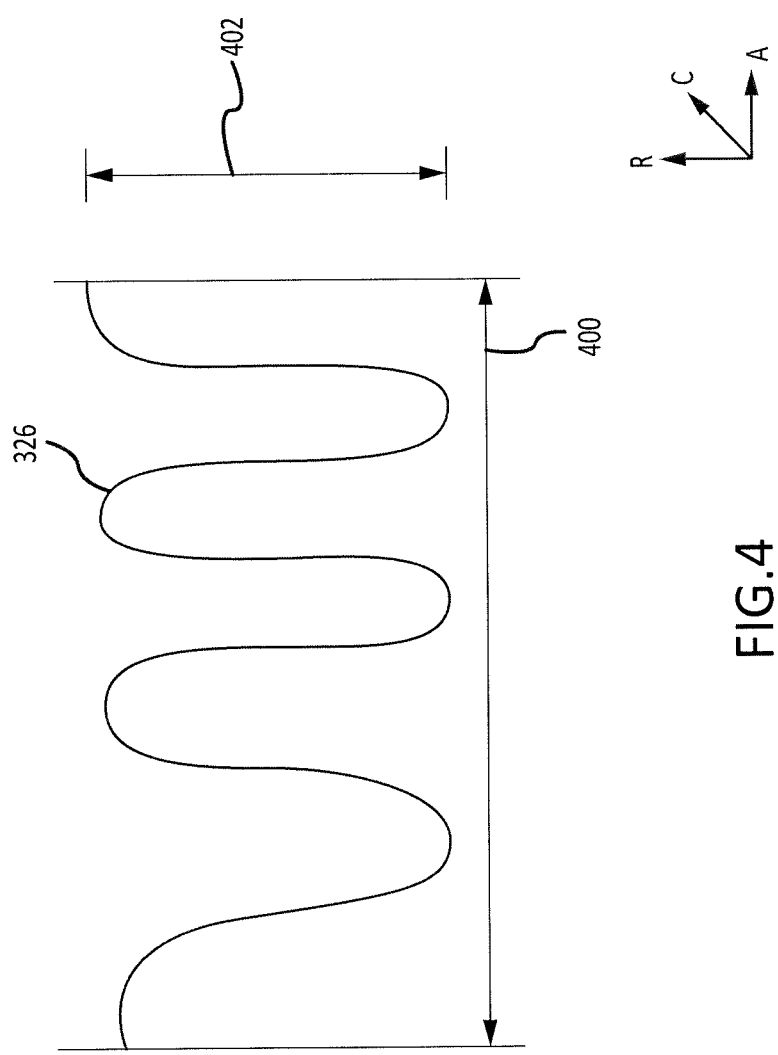
FIG. 4 is a cross-sectional view of the bellows seals of FIG. 3, in accordance with various embodiments.

Referring to FIGS. 3 and 4, a radial gap 344 may exist between the shroud main body 300 and the BOAS aft axial portion 322 where the second bellows seal 326 is located. The second bellows seal 326 may have a radial distance 402 in the radial direction. In various embodiments, the radial distance 402 of the second bellows seal 326 may be about the same as the radial gap 344. The relationship between the radial gap 344 and the radial distance 402 of the second bellows seal 326 may likewise apply to the first bellows seal 324 and its corresponding location.

An axial gap 346 may exist between the aft outer portion 343 and the shroud aft radial portion 308 where the second bellows seal 326 is located. The second bellows seal 326 may have an axial distance 400 in the axial direction in response to being in a fully extended position. Stated differently, the second bellows seal 326 has the axial distance 400 in response to a lack of pressure being applied to the second bellows seal 326. In various embodiments, the axial distance 400 of the second bellows seal 326 in the fully extended position may be greater than the axial gap 346. For example, the axial distance 400 may be 5%, 10%, 20%, 40%, or the like greater than the axial gap 346.

In that regard, in response to being positioned between the aft outer portion 343 and the shroud aft radial portion 308, the second bellows seal 326 may be compressed between the aft-facing BOAS face 334 of the aft outer portion 343 and the forward-facing shroud face 330 of the shroud aft radial portion 308. Such compression of the second bellows seal 326 may increase the ability of the second bellows seal 326 to resist air leakage. The relationship between the axial gap 346 and the axial distance 400 of the second bellows seal 326 may likewise apply to the first bellows seal 324 and its corresponding location.

As shown, the bellows seals 324, 326 may include 5 bends. However, in various embodiments, bellows seals in accordance with various embodiments may include any quantity of bends.

The first bellows seal 324 and the second bellows seal 326 may include any of a variety of materials. With reference to FIGS. 1 and 3, the material of the bellows seals 324, 326 may be selected based on the location of the bellows seals 324, 326 within the gas turbine engine 20. In particular, it may be desirable for the material of the bellows seals 324, 326 to have a greater temperature resistance (i.e., resist deformation at a relatively greater temperature) if located in the high pressure turbine section 54 or the high pressure compressor section 52 rather than the low pressure turbine section 46 or the low pressure compressor section 44.

In various embodiments, the bellows seals 324, 326 may include a nickel-based alloy, a cobalt-based alloy, or the like. Where used in this context, a nickel-based alloy includes more nickel by weight percent (wt %) than any other single element and, where used in this context, a cobalt-based alloy includes more cobalt by wt % than any other single element. For example, a compound having 40% nickel, 30% cobalt and 30% aluminum may be referred to as a nickel-based alloy.

For example, the bellows seals 324, 326 may include a high performance nickel-based super alloy. As another example, the bellows seals 324, 326 may include a cobalt-nickel-chromium-tungsten alloy. As yet another example, the bellows seals 324, 326 may include an austenitic nickel-chromium-based alloy.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blade outer air seal (BOAS) assembly, comprising:
   a rotor blade configured to rotate about an axis;
   a BOAS positioned radially outward from the rotor blade and having a BOAS main body, a BOAS forward radial portion extending radially outward from the BOAS main body, a BOAS forward axial portion extending axially forward from the BOAS forward radial portion, a forward wing extending forward from the BOAS forward radial portion, and a forward-facing BOAS face defined by the BOAS forward radial portion;
   a shroud block positioned radially outward from the BOAS, having a shroud main body, a shroud forward radial portion extending radially inward from the shroud main body, a shroud forward axial portion extending axially aft from the shroud forward radial portion, and an aft-facing shroud face defined by the shroud forward radial portion, the shroud block being configured to support the BOAS; and
   a first bellows seal extending from the forward-facing BOAS face to the aft-facing shroud face and configured to reduce fluid leakage radially between the BOAS and the shroud block,
   wherein:
      the first bellows seal is located in a cavity having a forward edge defined by the shroud forward radial portion, a radially inner edge defined by the BOAS forward axial portion, an aft edge defined by the BOAS forward radial portion, and a radially outer edge defined by the shroud main body; and
      the shroud forward axial portion is located between the BOAS forward axial portion and the forward wing.

2. The BOAS assembly of claim 1, further comprising a second bellows seal, wherein:
   the BOAS further includes an aft-facing BOAS face;
   the shroud block further includes a forward-facing shroud face; and
   the second bellows seal extends from the aft-facing BOAS face to the forward-facing shroud face and is configured to further reduce the fluid leakage radially between the BOAS and the shroud block.

3. The BOAS assembly of claim 1, wherein the BOAS forward axial portion is received between the shroud main body and the shroud forward axial portion to resist separation of the BOAS from the shroud block.

4. The BOAS assembly of claim 1, wherein the BOAS forward radial portion has a forward inner portion connected to the BOAS main body and a forward outer portion connected to the forward inner portion and extending radially outward from the forward inner portion, and the BOAS forward axial portion is positioned radially between the forward outer portion and the forward inner portion.

5. The BOAS assembly of claim 1, wherein an axial tolerance exists between the BOAS forward axial portion and the shroud forward radial portion to allow axial movement of the BOAS relative to the shroud block.

6. The BOAS assembly of claim 1, wherein an axial gap extends from the forward-facing BOAS face to the aft-facing shroud face, and the first bellows seal has an axial length in a fully extended position that is greater than the axial gap such that the first bellows seal is compressed between the forward-facing BOAS face and the aft-facing shroud face.

7. The BOAS assembly of claim 1, wherein the first bellows seal includes at least one of a cobalt based alloy or a nickel based alloy.

8. A blade outer air seal (BOAS) assembly, comprising:
   a rotor blade configured to rotate about an axis;
   a BOAS positioned radially outward from the rotor blade and having a BOAS main body, a BOAS aft radial portion extending radially outward from the BOAS main body, a BOAS aft axial portion extending axially aft from the BOAS aft radial portion, an aft wing extending aft from the BOAS main body, and an aft-facing BOAS face defined by the BOAS aft radial portion;
   a shroud block positioned radially outward from the BOAS, having a shroud main body, a shroud aft radial portion extending radially inward from the shroud main body, a shroud aft axial portion extending axially forward from the shroud aft radial portion, and a forward-facing shroud face defined by the shroud aft radial portion, the shroud block being configured to support the BOAS; and a bellows seal extending from the aft-facing BOAS face to the forward-facing shroud face and configured to reduce fluid leakage radially between the BOAS and the shroud block, wherein:
the first bellows seal is located in a cavity having an aft edge defined by the shroud aft radial portion, a radially inner edge defined by the BOAS aft axial portion, a forward edge defined by the BOAS aft radial portion, and a radially outer edge defined by the shroud main body; and the shroud aft axial portion is located between the BOAS aft axial portion and the aft wing.

9. The BOAS assembly of claim 8, wherein the BOAS aft axial portion is received between the shroud main body and the shroud aft axial portion to resist separation of the BOAS from the shroud block.

10. The BOAS assembly of claim 8, wherein the BOAS aft radial portion has an aft inner portion connected to the BOAS main body and an aft outer portion connected to the aft inner portion and extending radially outward from the aft inner portion, and the BOAS aft axial portion is positioned radially between the aft outer portion and the aft inner portion.

11. The BOAS assembly of claim 8, wherein an axial tolerance exists between the BOAS aft axial portion and the shroud aft radial portion to allow axial movement of the BOAS relative to the shroud block.

12. The BOAS assembly of claim 8, wherein an axial gap exists from the aft-facing BOAS face to the forward-facing shroud face, and the bellows seal has an axial length in a fully extended position that is greater than the axial gap such that the bellows seal is compressed between the aft-facing BOAS face and the forward-facing shroud face.

13. The BOAS assembly of claim 8, wherein the bellows seal includes at least one of a cobalt based alloy or a nickel based alloy.

14. A gas turbine engine having an axis and comprising:
a compressor section configured to compress a fluid;
a combustor section configured to mix the fluid with fuel and combust the fluid and the fuel to generate exhaust; and
a turbine section configured to receive the exhaust and convert the exhaust into torque,
wherein at least one of the compressor section or the turbine section includes:
a rotor blade configured to rotate about the axis,
a BOAS positioned radially outward from the rotor blade and having a BOAS main body, a BOAS forward radial portion extending radially outward from the BOAS main body, a BOAS forward axial portion extending axially forward from the BOAS forward radial portion, a forward wing extending forward from the BOAS main body, and a forward-facing BOAS face defined by the BOAS forward radial portion,
a shroud block positioned radially outward from the BOAS, having a shroud main body, a shroud forward radial portion extending radially inward from the shroud main body, a shroud forward axial portion extending axially aft from the shroud forward radial portion, and an aft-facing shroud face defined by the shroud forward radial portion, the shroud block being configured to support the BOAS, and
a first bellows seal extending from the forward-facing BOAS face to the aft-facing shroud face and configured to reduce fluid leakage radially between the BOAS and the shroud block,
wherein:
the first bellows seal is located in a cavity having a forward edge defined by the shroud forward radial portion, a radially inner edge defined by the BOAS forward axial portion, an aft edge defined by the BOAS forward radial portion, and a radially outer edge defined by the shroud main body; and
the shroud forward axial portion is located between the BOAS forward axial portion and the forward wing.

15. The gas turbine engine of claim 14, wherein:
the BOAS further includes an aft-facing BOAS face;
the shroud block further includes a forward-facing shroud face; and
the at least one of the compressor section or the turbine section further includes a second bellows seal that extends from the aft-facing BOAS face to the forward-facing shroud face and is configured to further reduce the fluid leakage radially between the BOAS and the shroud block.

* * * * *